March 28, 1944.  C. R. WASEIGE  2,345,082
PLANT FOR DISTRIBUTING AIR UNDER PRESSURE AND
IN CONSTITUTING PARTS THEREOF
Filed March 6, 1941  2 Sheets-Sheet 2
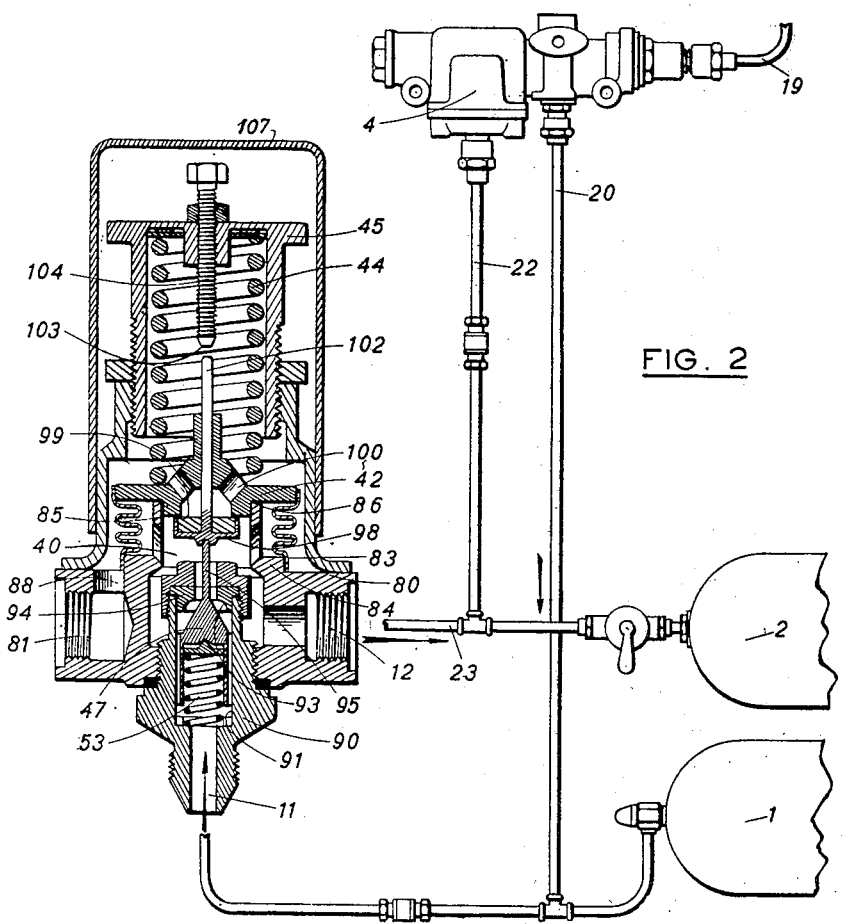
Inventor:
C. R. Waseige
By Glascock Downing & Seebold Patented Mar. 28, 1944

2,345,082

UNITED STATES PATENT OFFICE 2,345,082

PLANT FOR DISTRIBUTING AIR UNDER PRESSURE AND IN CONSTITUTING PARTS THEREOF

Charles Raymond Waseige, Rueil-Malmaison, France; vested in the Alien Property Custodian Application March 6, 1941, Serial No. 382,106
In France March 6, 1940

4 Claims. (Cl. 230—2)

My invention relates to plants for supplying air under pressure, more particularly for use on aircraft, when air under various pressures has to be supplied to the various apparatus needing it, some of which, such as pneumatic lifting jacks, pneumatic starters, etc., require air under a relatively high pressure, for instance between 800 to 1500 pounds per square inch, and others of which, such as automatic steering apparatus, require air under a much lower pressure, for instance between 150 to 300 pounds per square inch.

It has already been proposed to connect the distributing circuits of such plants with a common compressed air reservoir filled from a generator or a bank of generators with air under the highest pressure and connected by means of pressure reducing valves with the circuit or circuits at lower pressure. This arrangement has the drawback that it requires one or several generators of such substantial power as to be able to fulfill simultaneously the needs of various circuits which may have to be used simultaneously.

On the other hand, it is usual to interpose between the permanently driven generator or generators and the high pressure reservoir of an air distributing plant a control valve, or regulator, arranged to automatically connect the delivery of said generator or generators with a release outlet, usually leading to the open air, when the pressure in the reservoir attains a maximum limit value and to again connect it with said reservoir when the pressure therein becomes lower than a predetermined minimum value, the latter being however higher than the air pressure in the low pressure circuit or circuits.

One object of the present invention is to provide an air distributing plant of the aforesaid kind comprising at least such a control valve between the generator or generators and the high pressure reservoir and arranged so as to require only one or several generators the power of which is substantially smaller than that of the heretofore known plants, and adapted to supply in an entirely automatic manner air under different pressures to at least two circuits.

A plant constructed in accordance with this invention is essentially characterized in that the release of said control valve is connected with one or all of the low pressure circuits.

Under these conditions, as soon as the maximum pressure obtains in the high pressure reservoir, the delivery of the generator or generators feeds through said control valve the low pressure circuit, which usually also comprises a reservoir, and said high pressure is again connected with the generator or generators, as soon as the pressure therein falls under the lower limit.

The air generator or generators are thus rationally utilized in a more continuous manner than in the usual plants.

The plant comprises advantageously besides the aforesaid control and relief valves a pressure reducing valve branched between the delivery circuit of the generator or generators and the low pressure circuit, so as to secure the feeding of said circuit during the rise of pressure in the high pressure reservoir.

The relief valve of the low pressure circuit may be arranged in parallel or in series with the conduit feeding the low pressure or other reservoir.

In the latter case, it is advantageously combined with an automatic distributing valve connecting the release passage of the control valve with the open air while at the same time disconnecting the reducing valve if it is desired that the low pressure circuit will not be supplied.

According to another embodiment of the invention, the reducing valve and the relief valve are embodied into a single apparatus, called automatic release reducing valve, connected both with the high pressure circuit and the low pressure circuit.

This automatic discharge reducing valve may advantageously comprise a chamber which is connected with the low pressure circuit and a wall of which is movable and urged against the pressure in this circuit by a resilient member, said movable wall controlling two combined valves through which said chamber is respectively connected with the high pressure air inlet passage and a release pasage, the whole being so balanced that this wall only opens the first valve when the pressure in said chamber becomes lower than a predetermined value and only opens the second valve after the closure of the first one and when the pressure in the chamber exceeds a second predetermined value substantially higher than the first value.

A single resilient member thus assures the control of the low pressure and avoids any overlapping in the operation of the high pressure air inlet and release valves, which might otherwise cause a continuous release of air.

The simplification thus effected may further be increased, according to another feature of the invention, by combining the automatic release reducer and the regulator into a single controlling and reducing apparatus.

This apparatus, all the features of which may be adjusted while being assembled or inspected, embodies in itself all the essential parts of the plant supplying the reservoirs, so that no adjustment is necessary after the assembly.

The present invention also comprises in its scope, as new industrial products, the individual elements of my improved plant, which may be used in plants differing from that described.

Other features and advantages of the invention will be apparent from the following description with reference to the annexed drawings, showing preferred embodiments by way of example, in which:

Fig. 2 shows a modification in which use is made of an automatic release reducing valve;

Fig. 3 is a schematic view of a combined controlling and reducing valve.

Figure 1:
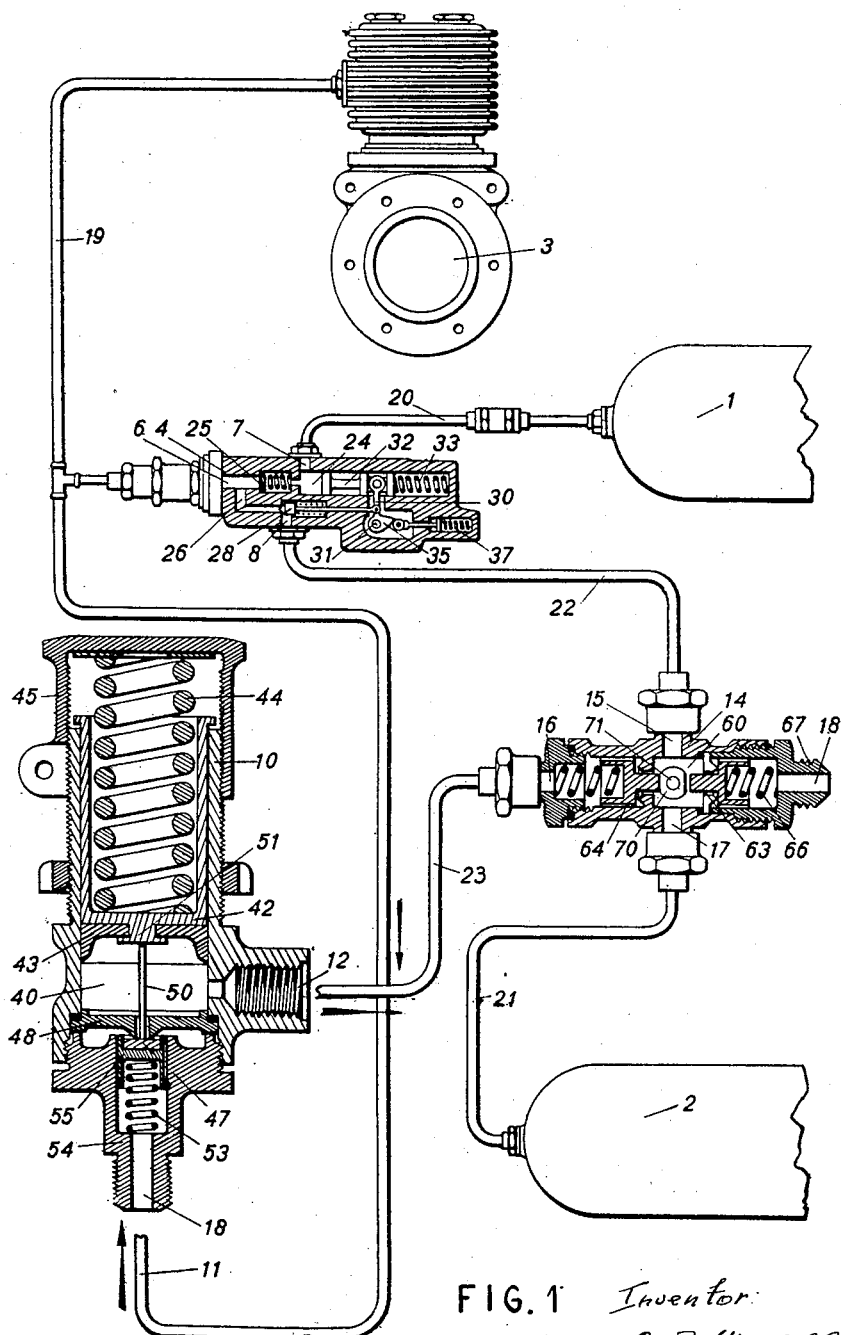
Fig. 1 shows a plant constructed in accordance with the invention.

In order to simplify the description, the usual accessories of the plant, such as decanters, filters, diaphragms, cutting-out valves or cocks, etc., have not been shown in Figs. 1 and 2 and it is assumed that the plant comprises only two distributing circuits.

In accordance with the embodiment shown in Fig. 1, the plant comprises for feeding with air a high pressure reservoir 1 and a low pressure reservoir 2, and air compressor or generator 3 for producing air under high pressure, a control valve 4 comprising inlet, outlet and release passages 6, 7 and 8, a pressure reducing valve 10 with inlet and outlet passages 11 and 12 and a distributing valve 14 having two inlet passages 15 and 16, one outlet passage 17 and one release passage 18. A conduit 19 connects the discharge of the generator 3 with the inlet passage 6 of control valve 4 and the inlet passage 11 of reducing valve 10. The reservoirs 1 and 2 are connected through conduits 20 and 21 with the outlet passages 7 and 17 of control valve 4 and distributing valve 14, respectively. Conduits 22 and 23 connect the inlet passages 15 and 16 of distributing valve 14 with the release passage 8 of control valve 4 and the outlet passage 12 of reducing valve 10.

The control valve 4, of a known type, comprises a chamber 24 with which the inlet passage 6 communicates through a non-return valve 25 and into which opens the outlet passage 7. A duct 26 opening into the passage 6 beyond the non-return valve 25 leads to the release passage 8. Inserted in this duct 26 is a valve 28 serving to close it normally and connected by a stem to a lever 30 pivoting, at one end, on a fixed pin 31 and, at the other end, on a movable system 32 serving as a piston and urged by the opposing actions of a calibrated spring and the pressure in the chamber 24. A wedge-like cam 35 rigidly connected to the lever 30 so as to rotate with the latter round the pin 31 co-operates with a follower roller pressed against the periphery of said cam by a spring 37.

The pressure reducing valve 10, which is also of a known type, comprises a chamber 40 into which opens the low pressure air outlet passage 12. Said chamber forms one end of a cylinder the piston 42 of which carries a sealing cup 43 and is subjected to the aforesaid low pressure of air acting against the action of a spring 44 retained by a cap 45 screwed upon the housing of said valve.

The inlet passage 11 for air under high pressure communicates with the chamber 40 through a valve 47 the seat for which is carried by a part 48 secured to the housing 10. Said valve 47 carries a stem 50 held in engagement with a central projection 51 on piston 42 by a spring 53. Said spring 53 is seated at one end, in a head 54 secured to the housing 10 and, at the other end, in a sliding sleeve 55 containing the valve proper 47.

The distributing valve 14 comprises a chamber 60 into which open the inlet and outlet passages 15, 17. This chamber 60 is connected through valves 63, 64 with the release passage 18, usually opening into the atmosphere, and the air inlet passage 16, respectively. The seats of these two valves are integral with the valve body. Valve 63 is urged towards its seat, against the pressure of air in chamber 60, by a suitably calibrated spring 66 engaging with a nipple-like head 67 provided with the passage 18. Valve 64 is arranged in a similar way. Both valves are provided with stems projecting through the seats thereof and co-operating with a cam 70 which is rigidly secured upon a shaft 71 and so shaped that it opens either the one or the other of the valves according to whether the position it assumes is that shown in the drawings (valve 64 being then opened) or the symmetrical position. A hand lever (not shown) secured to the shaft 71 controls the rotation of the cam 70.

The operation is as follows:

Air delivered by the generator 3 into the conduit 19 is admitted through the latter into the inlet passages 6 and 11 of the control valve and the reducing valve.

As long as reservoir 1 is not under full pressure:

1. The valve 28 provided inside the control valve is closed and air under pressure passing through the non-return valve 25 leaves the control valve through the outlet 7 and is led to the said reservoir 1 by the conduit 20.

2. The air admitted by the conduit 11 may or may not enter into the chamber 40 through the valve 47 which is opened or closed according as whether or not the pressure in this chamber is higher than the pressure value that would exert upon the piston 42 a thrust counterbalancing the force exerted on the other side of said piston by the spring 44. This pressure value, substantially lower than the pressure in the conduit 11, is that of the air leaving the reducing valve by the conduit 23 leading to the inlet 16 of distributing valve 14. The position of the parts of the latter valve is as shown in Fig. 1; hence compressed air flows out of said distributing valve through outlet 17 and is led by conduit 21 to reservoir 2.

As soon as the pressure obtaining in the reservoir 1 attains its predetermined maximum limit value, the force exerted by the air upon piston 32 of control valve 4 counter-balances the opposing elastic forces and causes said piston to slide towards the right as shown in Fig. 1, the cam 35 acting as a latch. The valve 28 is then opened and the passage 6 is connected with the release 8, the non-return valve 25 disconnecting said passage from chamber 24 and reservoir 1. The air delivered by the compressor is then transferred by conduit 22 to the distributing valve 14 and thence, through conduit 21, to reservoir 2. The relief valve 63 prevents the pressure in conduits 21 and 22 from exceeding the pressure value corresponding to the calibration of its spring 66, which is substantially lower than the pressure of air supplied to reservoir 1 and slightly higher than the pressure of air supplied by the reducing valve 10. As this pressure value is transmitted by the conduit 23 to the chamber 40 of said reducing valve, the valve 47 is held upon its seat so that the reducing valve will not operate.

As soon as the pressure in reservoir 1 becomes lower than a predetermined limit, the spring 33 brings the piston 32 back to its starting position against the pressure of air in chamber 24, the valve 8 is closed and the cycle is repeated.

To disconnect the low pressure reservoir 2 from the circuit, it is only necessary to rotate the cam 70 of the distributing valve 14 through a half-revolution, by means of the hand lever carried by the shaft 71. This closes the valve member 64, thus isolating the reducing valve 10, and opens the relief valve 63. The release passage 8 of control valve 4 is then permanently connected with the open air.

In accordance with the modification shown in Fig. 2, a reducing valve with automatic release 80 comprising an inlet passage 11, an outlet passage 12 and a release passage 81, usually connected with the open air, is provided instead of the reducing and distributing valves according to the embodiment previously described. The control valve 4, of the same type as that already described, to the inlet passage of which the conduit 19 delivering air from the generator is connected, has its outlet passage leading through a conduit 20 to the high pressure reservoir 1 and to the inlet passage 11 of automatic release pressure reducing valve 80. The release passage of the control valve 4 is connected by a conduit 22—23 with the outlet passage 12 of reducing valve 80 and the low pressure reservoir 2.

The reducing valve comprises a chamber 40 into which opens the outlet passage 12. One wall of this chamber 40 is formed by a piston 42 the periphery of which is connected by an undulated sleeve-like diaphragm 83 to an outer shoulder 84 of the side wall 85 of said chamber 40. Acting on the piston 42 against the pressure exerted thereon by the air contained in chamber 40 is a spring 44 urging same towards a seat 86 formed at the end of the side wall 85. The spring engages on the one hand with the outer side of piston 42 and on the other hand with the bottom of a sleeve cap screwed on the body of valve 80. The outer side of piston 42 is subjected to the pressure of air in the release passage 81 with which the part of the body which contains it communicates through a port 88.

The inlet passage 11 is provided in a separated nipple 90 tightly sealing the bottom of chamber 40. As an extension of the passage 11 is formed in said nipple 90 a cylindrical lodgment 91 coaxial with the piston 42. A valve member 47 is slidably mounted in this lodgment 91 which encloses a spring 53 urging said member towards its seat 93 provided on a part 94 screwed onto the end of nipple 90 projecting into chamber 40. The valve member 47 is extended by a central stem 95 that projects through the part 94 and engages with another valve member 98 co-operating with an annular seat 99 provided on piston 42. Openings 100 are provided through said piston 42 inside the seat 99. The valve member 98 carries an axial stem extension 102 slidably mounted in a guide provided on piston 42, the end of said stem 102 being arranged opposite to a stop 103 formed by the end of a screw 104 mounted in the bottom of cap 45. Said screw 104 is adjusted so that the stem 102 engages therewith as the valve member 47 is applied upon its seat 93. A protecting hood 107 surrounds the whole device.

The operation is as follows:

During the rise of pressure in reservoir 1, compressed air supplied to this reservoir is simultaneously admitted into the inlet passage 11 of reducing valve 80. The latter then operates as a usual pressure reducing valve, i. e., the valve member 47 is held in its opening position by the piston 42 as long as the pressure in chamber 40 connecting with reservoir 2 remains lower than the calibrated pressure of the spring 53. As soon as this pressure is attained, however, the valve member 47 will be applied upon its seat 93 by said spring 53, after which the same process will be effected as the air pressure becomes lower, so that the reservoir 2 is supplied with air at the low pressure required.

When the pressure of air in the reservoir 1 reaches the maximum limit value of control valve 4, the latter disconnects the conduit 20 and connects the compressed air inlet conduit 19 and the release conduit 22 supplying the reservoir 2 by means of the conduit 23, one end of which opens into the chamber 40. When the pressure of air in this chamber 40 rises, the piston 42 is shifted against the counteraction of spring 44, so that beyond a fixed limit, as the stem 102 strikes against the end 103 of the screw 104, the holes 100 are uncovered by the valve member 98 and connect the chamber 40 with the release 81. There is thus obtained a relief valve preventing any excess of pressure in the conduit 23 on which it is branched.

The provision of a single spring 44 prevents any overlapping between the admission and delivery of air into and from the chamber 40, thereby preventing a continuous release of air.

In order to still more simplify the assembling by reducing the connections, there is shown in Fig. 3 an example of a controlling-reducing valve assembly 109 arranged to be used instead of the separated control and reducing valves shown in Fig. 2. This new apparatus comprises four passage couplings, namely an inlet passage 6 arranged to be connected with the generator, two outlet passages 7 and 12 arranged to be connected with the high and low pressure reservoirs, respectively, and a release passage 81, usually connected with the open air.

The inlet passage 6 opens into a chamber 110 connecting through a non-return valve 25 with a chamber 111 extending the whole length of the housing 109 and into which opens the passage 7 connected with the high pressure reservoir. Between the chambers 110 and 111 is provided an intermediate chamber 112 into which opens the passage 12 connected with the low pressure circuit. The connection between the chambers 110 and 112 is secured through the valve member 28 which is a part of a control valve and forms the release valve of the same. While this control valve may be of the same type as that shown in Fig. 1, it has been shown herein as being of a different construction.

According to this embodiment, the valve 28 is not balanced and it carries a stem 114 engaging with a wall 116 formed as a plunger piston which moves in the direction of the shifting motion of the valve 28 and a side of which is secured in an airtight manner to a bellows-like resilient sleeve 118 the other end of which is connected with the periphery of a hole 120 opening into the chamber 111. The piston 116 is provided with a flange on which is resting a spring 122 urging said piston in the direction of the closing movement of valve 28.

The chambers 111 and 112 are connected together through a valve 47 which is the inlet valve of a reducing valve of the automatic release type shown in Fig. 2 and is shown only in a schematic manner in Fig. 3. The parts of this reducing valve are contained in a chamber 125 into which opens the release passage 81 and in which is slidably mounted a piston 42 provided with the seat of a valve 98 combined with the valve 47 to which it is connected by a stem 95. A light spring 53 tends to move both valves in the direction of their seats. That side of piston 42 opposite the two valve members 98, 47 is subjected to the pressure obtaining in chamber 112, which is transmitted to it through the hole 127 surrounding the stem 95, air-tightness being secured by a resilient sleeve-like diaphragm 83 connecting the periphery of this piston to a shoulder provided around the hole 127. The piston 42 is subjected to the pressure of air in chamber 112 in counteraction to a spring 44 resting upon the bottom of chamber 125.

The operation is as follows:

During the rise of pressure in the high pressure reservoir and as long as the air pressure therein has not attained the maximum limit value, the valve 28 is closed and air admitted into the apparatus by the passage 6 enters into the chamber 111 through the non-return valve 25. A portion of this air is directed towards the reservoir through the passage 7 and another portion is reduced in pressure while passing through the chamber 112 and conducted towards the low pressure reservoir through the passage 12. This reduction of pressure is effected exactly as described relatively to the previous examples, the opening and the closing of valve 47 being controlled by the piston 42.

As soon as the pressure in the reservoir and therefore in the chamber 111 attains its upper limit value, the thrust exerted by the air pressure against the piston 116 counterbalances the forces exerted by spring 122 on said piston and by the pressure of the air in chamber 110 on the valve member 28. The latter opens suddenly and the forces exerted on both sides thereof are then equalized. As the chambers 110 and 112 are now connected by the valve 28, there occurs a substantial drop of pressure in the first chamber and rise of pressure in the second chamber supplying the low pressure circuit. Owing to this r se of pressure the piston 42 is shifted against the action of the spring 44, the valve 47 is closed and the valve 12 acts as a relief valve as described in the previous embodiment. When the pressure in the chamber 111 connected with the high pressure reservoir becomes sufficiently low so that it may be counterbalanced by the spring 122, the valve 28 is returned upon its seat and the cycle is repeated.

The invention is, of course, in nowise limited to the embodiments shown and described as examples, and it is particularly obvious that, without departing from the scope of said invention, there may be introduced into the various circuits the usual accessories such as diaphragms, valves, cutting-out, blow-off or coupling devices, filters, cleaners and the like.

While I have described what I at present consider preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim is:

1. A compressed gas distributing plant, more particularly for use on board aircraft, comprising at least one gas compressor, at least two gas circuits adapted to be supplied by said compressor at substantially different pressures and called high pressure circuit and low pressure circuit, a high pressure reservoir and an unloader system in said high pressure circuit, said unloader system being mounted between said compressor and said reservoir and provided with an outlet passage, said system being arranged to automatically connect the delivery of the compressor and said passage in response to the pressure in said reservoir reaching a predetermined value, and connecting means between said outlet opening and the low pressure circuit.

2. A compressed gas distributing plant more particularly for use on board aircraft comprising at least one gas compressor, at least two gas circuits adapted to be supplied by said compressor at substantially different pressures and called high pressure and low pressure circuits, a high pressure reservoir and an unloader system in said high pressure circuit, said unloader system being mounted between said compressor and said reservoir and provided with an outlet passage adapted to be automatically connected to the delivery of the compressor in response to the pressure of the reservoir reaching a predetermined value, connecting means between said outlet opening and the low pressure circuit, further means connecting the high pressure circuit, between said compressor and said system and the low pressure circuit, and a reducing valve in said further means adapted to feed the low pressure circuit during the rise of pressure of the reservoir.

3. A compressor gas distributing plant more particularly for use on board aircraft comprising at least one gas compressor, at least two gas circuits adapted to be supplied by said compressor at substantially different pressures and called high pressure circuit and low pressure circuit, a high pressure reservoir and an unloader system in said high pressure circuit, said unloader system being mounted between the compressor and the reservoir and provided with an outlet passage adapted to be automatically connected to the delivery of the compressor in response to the pressure of the reservoir reaching a predetermined value, connecting means between said outlet opening and the low pressure circuit, a distributing system in said connecting means, further means connecting said distributing system with the high pressure circuit, between the compressor and the unloading system, a reducing valve in said further means, said distributing system including two valve members mounted to obturate respectively a discharge port and said further means, and operating means for said members arranged to simultaneously open the discharge and obturate the said further means when it is desired that the low pressure circuit will not be supplied.

4. A compressed gas distributing plant as claimed in in claim 3 in which said operating means includes a single control member cooperating with both said valves.

CHARLES RAYMOND WASEIGE.